July 15, 1969

A. M. MARKS 3,455,790

ELECTRICALLY CHARGED SPRAY-CONDENSER FOR
RECOVERING WATER DISTILLATE
Filed July 20, 1967

INVENTOR.
ALVIN M. MARKS

BY Albert F. Kronman

ATTORNEY

United States Patent Office 3,455,790
Patented July 15, 1969

3,455,790
ELECTRICALLY CHARGED SPRAY-CONDENSER
FOR RECOVERING WATER DISTILLATE
Alvin M. Marks, 153—16 10th Ave.,
Whitestone, N.Y. 11357
Filed July 20, 1967, Ser. No. 654,928
Int. Cl. C02b 1/00; B01d 5/00
U.S. Cl. 202—185                                8 Claims

ABSTRACT OF THE DISCLOSURE

A means for condensing the evaporated vapor from a body of salt or impure water is described. Fresh water jets discharge a stream of water droplets into a space adjacent to one or more positively charged small conductors. The droplets become charged and water vapor is condensed on the drops making them larger. The charged drops are then forced down through the electric field to a pure water tank; a floating oil layer on the surface prevents evaporation. A constant supply of water vapor from a sea water or other water supply is necessary.

BACKGROUND OF THE INVENTION

This invention relates to a means for condensing the water from the water vapor always present in the space above a large body of water. Since the result is a continuous supply of pure or potable water, the method is part of a process of converting salt, brackish or impure water into pure or potable water.

It is well know that in many parts of the world, fresh water is in short supply and because of this many schemes and devices have been developed and tested to convert sea or other available water into fresh potable water suitable for human consumption and for agriculture. One such process includes boiling the water and condensing the vapor by passing it over a cool surface. This process is too expensive and requires frequent cleaning of the cooling surfaces. Another process includes passing the water vapor, as normally produced above a body of water, over very cold refrigerated coils to condense the pure water. This process is also too expensive and requires frequent cleaning to maintain efficiency. Some chemical processes have been tried. They include precipitation of the salt or impurities by adding other chemicals. This process generally does not produce water pure enough to drink.

The present invention uses the water vapor naturally present above all bodies of water. The vapor is condensed by the application of charged aerosols. The charged water droplets have the effect of condensing water from the vapor in an undersaturated air. The charged drops grow in size and are then collected for use. The process is continuous and uses no energy except the pumping power which forms the aerosol spray and electrical power which charges the droplets. The sum total of energy required for this process is quite small and is only a fraction of the pumping energy necessary to deliver the fresh water to the consumers.

One feature of the invention is the use of the heating power of the sun which forms the water vapor near the surface of a body of water.

Another feature of the invention is the use of the normal wind motion which keeps the water vapor in motion and replenishes the vapor supply after some of the vapor has been condensed.

For a better understanding of the present invention, together with other details and features thereof, reference is made to the following description taken in connection with the accompanying drawings.

DESCRIPTION OF THE PREFERRED EMBODIMENT

Figure 1:
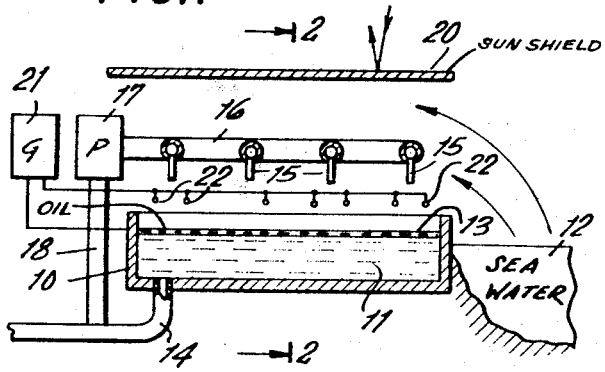
FIGURE 1 is a side view, partly in section, of one form of the invention.
Figure 2:
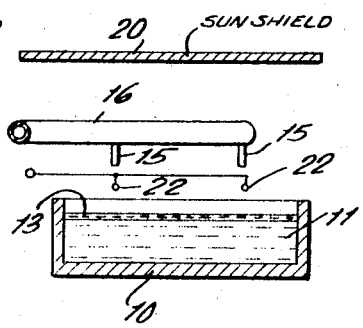
FIGURE 2 is a cross sectional view of the water purifier shown in FIGURE 1 and is taken along line 2—2 of that figure.
Figure 3:
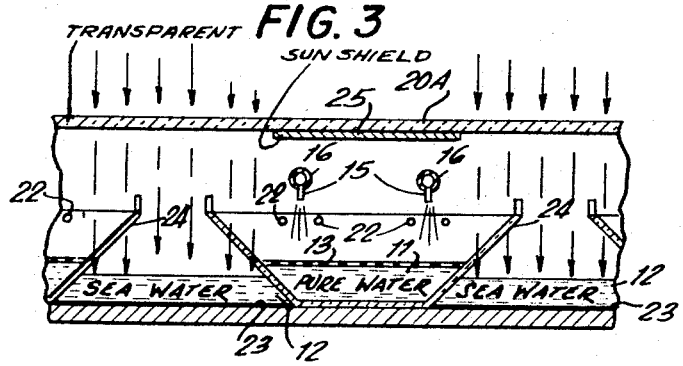
FIGURE 3 is a cross sectional view of another form of the invention wherein bodies of impure, brackish or salt water are positioned intermediate the pure water collector tanks.
Figure 4:
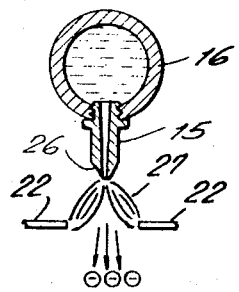
FIGURE 4 is a cross sectional view of a jet which forms the aerosol spray.
Figure 5:
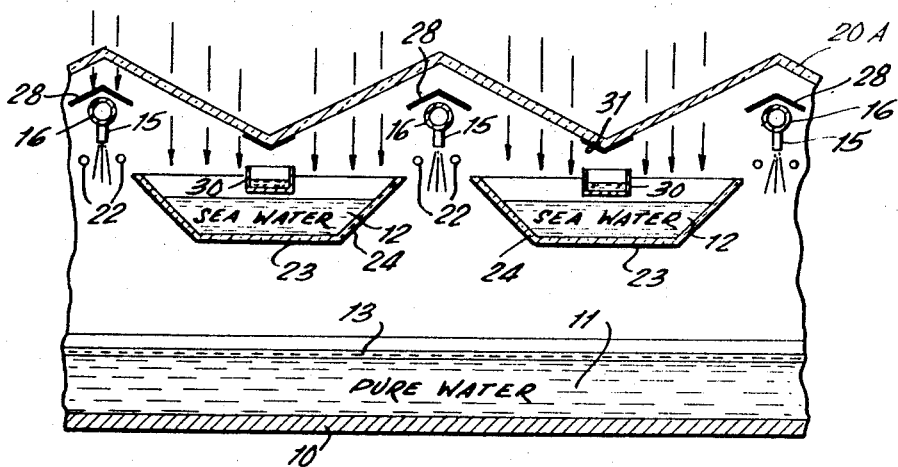
FIGURE 5 is a cross sectional view of still another form of the invention having inclined cover sections for collecting pure water which may condense on the inner surfaces of the cover.

Referring now to FIGURES 1 and 2, the water purifier comprises a tank 10 where pure water 11 is collected. The tank 10 is positioned adjoining a body of water such as impure water or sea water 12 so that water vapor from the body of water is always available. The top surface of the water 11 is covered with a thin layer of an oily liquid 13 such as a low vapor pressure hydrocarbon oil to prevent vaporization of the pure water after it has been collected. The oil 13 is preferably a non-inflammable oil such as a chlorinated oil to avoid a fire hazard. An exit conduit 14 is connected to tank 10 so that the pure water may be drawn off as it accumulates.

Charged aerosol jets are produced by a plurality of nozzles 15 connected to a common supply pipe 16. A pump 17 forces some of the pure water 11 from the exit conduit 14, through a pipe 18, and then pumps the water through the supply pipe 16 and the nozzles 15. The nozzles, supply pipe 16, and the water 11 in tank 10 are protected from the sun's rays by a cover shield 20 which is shown as a continuous plate in FIGURES 1 and 2, but which may be composed of a series of Venetian blind-like slats if it is desired to increase the circulation of the water vapor from the impure or salt water supply 12. In any case, the cover shield 20 either has a reflective coating on its upper side or is made from material which does not pass the heat waves from the sun.

A high voltage DC generator 21 is provided for forming and charging the aerosol droplets. The generator produces direct current of about 4,000 to 14,000 volts and each nozzle uses a current of about $10^{-5}$ amperes, or about 0.4 milliwatt. The negative terminal of the generator is grounded by connecting it to the tank 10 which is preferably made of a conductive material. The positive terminal of the generator is connected to a distribution system terminating in an open grid of wire conductors 22 placed in close proximity to the nozzles 15. Conductors 22, when charged to about 4.0 kilovolts, establish a strong electric field between the conductors and the nozzle orifices. The charged aerosol droplets break up under the influence of the charges on their surface to form a highly dispersed charged aerosol. This field not only charges the water droplets, it also creates an electric pumping action which forces the droplets down to the surface of the floating oil layer 13.

As the charged droplets move down through the water vapor they collect water by condensation thereon from the vapor and grow larger. This precipitation action occurs only if the humidity of the air is above a critical value which depends upon the temperature. It has been found that a charged droplet will condense water from air which is somewhat undersaturated, in which a neutral droplet will evaporate. For this reason, a charged aerosol is particularly efficacious for removing water from the atmosphere. Nevertheless, the relative humidity should be as high as possible. To increase the water content of the air, without great operating expense, the rays of the sun are used to warm the impure or sea water 12, and, where feasible, heat absorbing layers 23 (see FIGURES 3 and 5) are placed under the surface of the said water 12 to aid in raising the temperature. As the droplets move down and remove some of water vapor from the space under the cover 20, other vapor from the impure or salt water flows into the space and the process becomes continuous.

The cross sectional view shown in FIGURE 3 is fundamentally the same as that shown in FIGURES 1 and 2. The pure water is collected in tanks 24 which are provided with sloping sides made of a material which transmits the heat waves from the sun. The impure or sea water 12 is pumped into intermediate spaces between the pure water tanks 24 and these spaces are provided with a heat absorbing layer 23 to absorb the sun's rays and warm the water. The cover 20A in this embodiment is transparent to the sun's rays so that the water 12 may be heated, but a light barrier 25 is placed over the pure water 11 in tanks 24 to keep the pure water from being heated. The supply pipes 16 and nozzles 15 are the same as described in connection with FIGURES 1 and 2. The action is the same except that the operation is more efficient since the heated water 12 is closer to the nozzles 15 and maintains a humid atmosphere at all times.

The cross sectional view in FIGURE 4 shows the details of the nozzles 15. They are connected to the supply pipe 16 in any convenient manner, such as screw threads. To form a fine mist of small charged droplets, it is only necessary to apply an electric field between the charging electrodes 22 and the orifice 26, which is tapered as shown to concentrate the electrical field intensity at the orifice 26.

The water purifier shown in FIGURE 5 is substantially the same as the other embodiments except that the impure or sea water 12 is placed in tanks 24 above the pure water tank 10 and the cover 20A is made in roof-like peaked sections. Nozzles 15 direct a spray of droplets past charged conductors 22. The droplets collect water from the atmosphere and the accumulated liquid is deposited in tank 10. Tanks 24 have their lower surfaces covered with a heat absorbing layer 23 and each pipe 16 is protected by a heat ray reflector 28. These reflectors also shield the pure water tank 10 from the sun's rays.

The roof-like sections 20A are disposed at an angle to the horizontal so that any condensation on the under surface of the transparent sections 20A will be directed to the lower edges and drip into channels 30 positioned above the sea water surface. These channels accumulate pure water and convey it to the pure water tank 10. The area above the channels 30 is protected by a heat reflecting layer 31 to maintain the pure water at a lower temperature.

In FIGURES 1, 3, and 5, the sun's rays are shown as being applied vertically to the apparatus. Such a condition is possible only when a reflector of the sun's rays is used. However, the system works just about as well for the oblique rays of the sun, and thus will function most of the day. Heliostats, under some cicrumstances may be used to redirect the sun's rays. This type of mechanism is not shown because it is well known and forms no part of the invention.

Having thus fully described the invention, what is claimed as new and desired to be secured by Letters Patent of the United States, is:

1. A device for converting impure water into potable fresh water comprising, an open top container for impure water, a semiconfined space adjoining the impure water container and open to receive water vapor from the impure water, a roof over said space for providing protection from the sun's rays, a fresh water tank mounted in said space under the roof, a plurality of nozzles mounted under said roof and connected to a source of fresh water for creating a plurality of charged aerosol sprays above the fresh water tank, a plurality of conductors mounted adjacent to said nozzles for creating an electric field between the conductors and the nozzles to form and charge the charged aerosol spray, and to create an electric pumping action, and a high voltage direct current generator having one terminal connected to the tank and the other terminal connected to said conductors, whereby vapor from the impure water is condensed on to the said charged droplets and driven into the fresh water container.

2. A device as claimed in claim 1 wherein the water in the fresh water tank is covered with a non-miscible floating oil for preventing evaporation.

3. A device as claimed in claim 1 wherein a plurality of pure water tanks are assembled in spaced relation with each other and wherein the intermediate spaces between tanks are filled with impure water.

4. A device as claimed in claim 1 wherein a plurality of impure water tanks are assembled in spaced relation with each other and wherein the intermediate spaces between tanks are filled with fresh water.

5. A device as claimed in claim 1 wherein said roof extends over the impure water as well as the fresh water, said roof including heat transmitting areas over the impure water surfaces.

6. A device as claimed in claim 5 wherein said portions of the roof over the fresh water areas include light reflective areas for excluding the sun's rays from the fresh water.

7. A device as claimed in claim 5 wherein the roof is formed with a series of flat inclined planes for draining the underside surfaces of condensed water, the lower edges of said planes being positioned over channels for collection of fresh water.

8. A device as claimed in claim 5 wherein said roof is made up of spaced slats which cut off the sun's rays but permit air circulation therebetween.

References Cited

UNITED STATES PATENTS

| | | | |
|---|---|---|---|
| 956,097 | 4/1910 | Hoofnagle. | |
| 1,232,395 | 7/1917 | Schmidt et al. | |
| 2,138,689 | 11/1938 | Altenkirch | 203—10 X |
| 2,486,684 | 11/1949 | Schlesman et al. | 202—236 X |
| 2,582,281 | 1/1952 | Robertson | 219—47 |
| 3,060,297 | 10/1962 | Sargeant | 219—10.65 |
| 3,072,920 | 1/1963 | Yellott. | |
| 3,290,231 | 12/1966 | Ries et al. | 203—10 |
| 3,326,779 | 6/1967 | Rodgers | 202—236 X |

FOREIGN PATENTS

| | | | |
|---|---|---|---|
| 627,702 | 9/1961 | Canada. | |

NORMAN YUDKOFF, Primary Examiner

F. E. DRUMMOND, Assistant Examiner

U.S. Cl. X.R.

202—202, 234; 203—10